March 5, 1935.  R. W. BURNETT  1,993,207

HAND BRAKE RELEASING AND HOLDING MECHANISM

Filed Aug. 1, 1929  6 Sheets-Sheet 1

Inventor
Richard W. Burnett
By Burnett & Truman
Attorneys

March 5, 1935.  R. W. BURNETT  1,993,207
HAND BRAKE RELEASING AND HOLDING MECHANISM
Filed Aug. 1, 1929  6 Sheets-Sheet 2

Inventor
Richard W. Burnett
Barnett & Truman
Attorneys.

March 5, 1935.  R. W. BURNETT  1,993,207
HAND BRAKE RELEASING AND HOLDING MECHANISM
Filed Aug. 1, 1929  6 Sheets-Sheet 3

Inventor
Richard W. Burnett
Barnett & Truman
By
Attorneys

March 5, 1935.  R. W. BURNETT  1,993,207
HAND BRAKE RELEASING AND HOLDING MECHANISM
Filed Aug. 1, 1929   6 Sheets-Sheet 4

Inventor
Richard W. Burnett
Burnett & Truman
Attorneys

Patented Mar. 5, 1935

1,993,207

UNITED STATES PATENT OFFICE 1,993,207

HAND BRAKE RELEASING AND HOLDING MECHANISM

Richard W. Burnett, Chicago, Ill.

Application August 1, 1929, Serial No. 382,794

18 Claims. (Cl. 188—81.1)

This invention relates to hand brakes for railway cars, and particularly to a hand brake apparatus in which the power applying means involve a revoluble drum on which a chain is wound for taking up the slack and imparting movement to the brake rigging underneath the car.

The principal object of the present invention is to provide improved means for holding and releasing the power applying mechanism, particularly power applying mechanism of the above character, whereby the means for holding the pawl out of engagement with its associated ratchet will insure proper operation of the said holding pawl without affecting the movement of the releasing lever. In this connection I aim to provide a holding and releasing means in which the releasing lever, during the brake setting operation, and during the graduated release of the brake, (a release affected by the operator holding the hand wheel), will remain in substantially the same position.

Another object of the invention is to provide in this connection a weight member movable from one position to another, so as to over-balance the pawl to move it out of holding position and to provide also in this connection means for holding the weighted member in its set position, so as to prevent overthrow thereof by the action of the pawl.

A further object is to provide a hand brake of the above character in which the holding and releasing means include a shifting counterweight which is so arranged and cooperates with the holding pawl and the releasing lever, whereby either a complete and instantaneous release of the brake may be effected with a single movement of the releasing lever; or a step by step release involving successive engagements of the pawl or other holding device with the ratchet or other element with which it engages; or a graduated release under the control of the brakeman through manipulation of the hand wheel or other member employed for revolving the winding drum; or a retarded release, by forcing the holding member out of engagement with the power mechanism and moving it into engagement with a moving part thereof so as to retard the reverse movement of the power mechanism.

Further objects of the invention will be apparent from the detailed description of the two embodiments of the invention shown in the accompanying drawings, wherein.

Figures 1, 4, 5, 6, 7, 8:
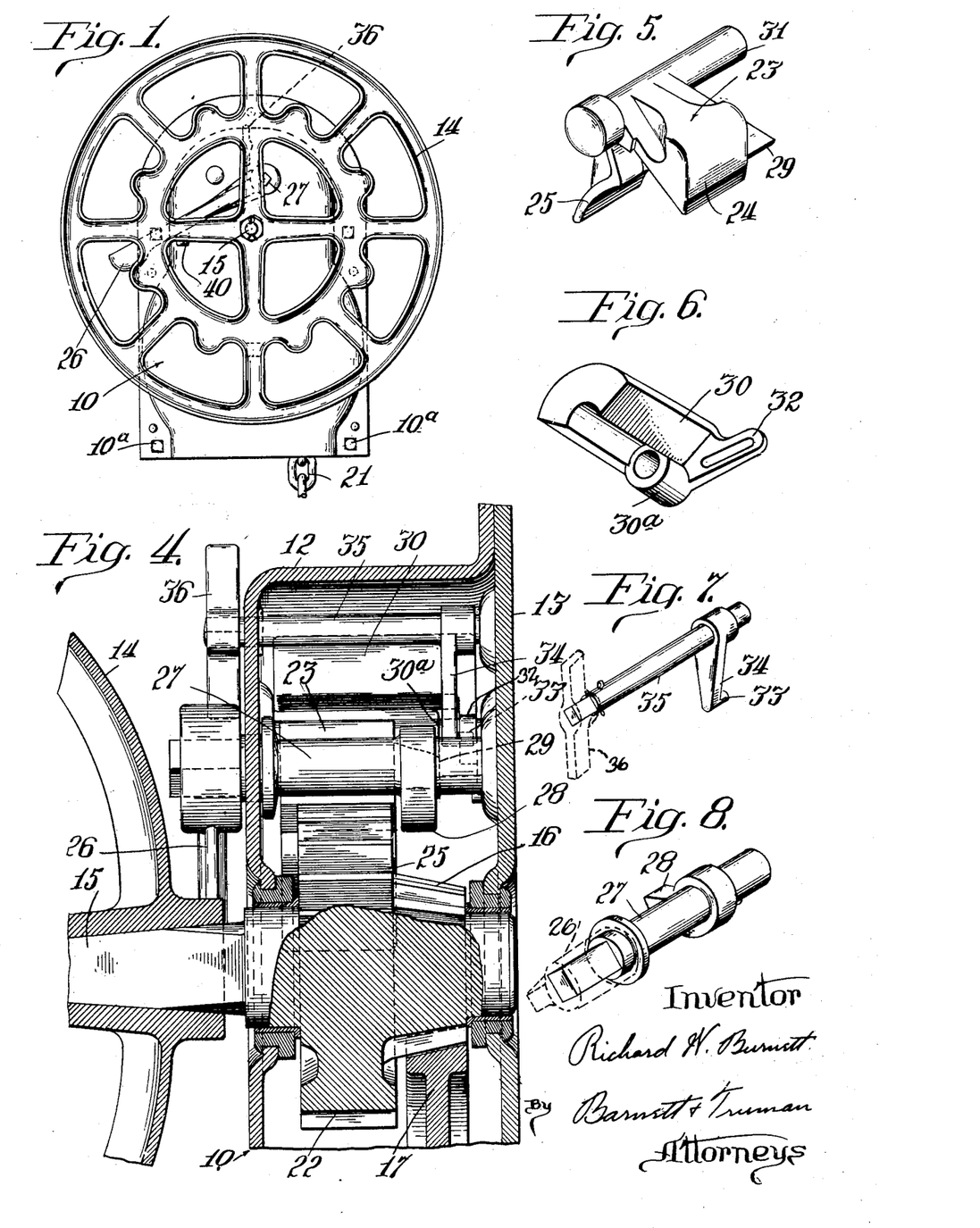
Fig. 1 is a front elevation of a railway car brake constructed in accordance with my invention.
Fig. 4 is a fragmentary cross section taken on line 4—4 of Fig. 2, looking in the direction indicated by the arrows.
Fig. 5 is a view in perspective of a holding pawl employed in the embodiment shown in Fig. 2.
Fig. 6 is a counter-weight adapted to cooperate with the said holding pawl.
Fig. 7 is an operating lever for shifting the position of the weight shown in Fig. 6.
Fig. 8 is a view in perspective of the cam shaft and the cam employed for forcing the holding pawl out of its holding position.
Figure 2:
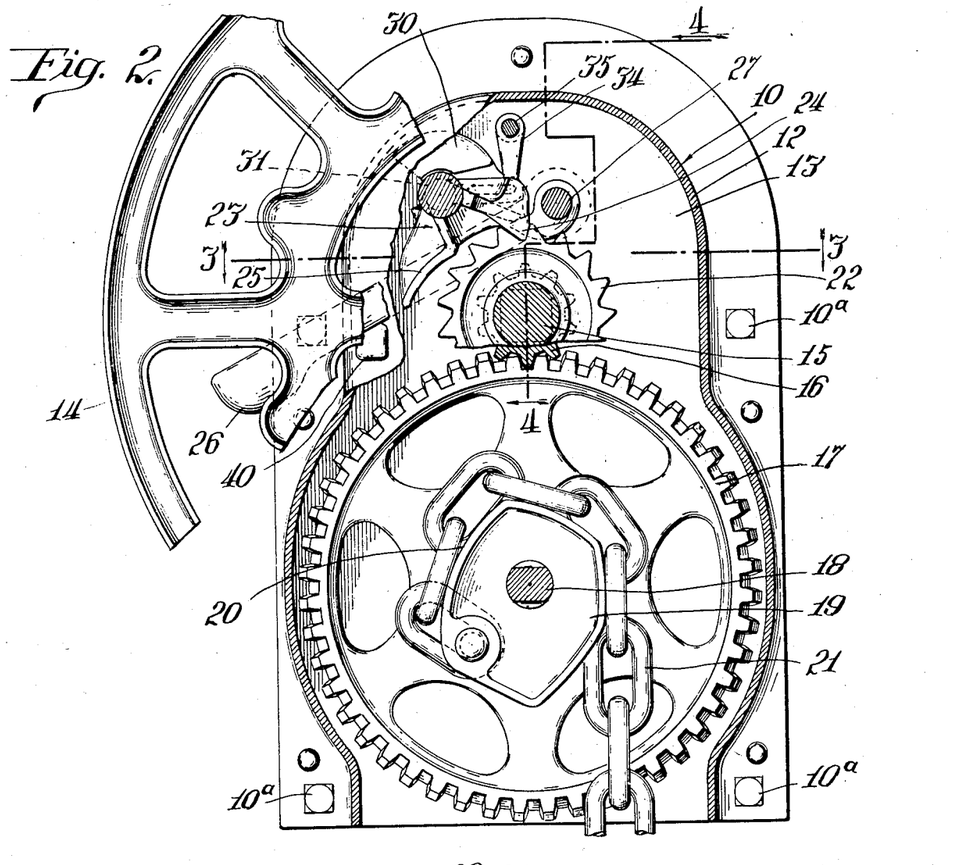
Fig. 2 is a front view, with parts broken away, illustrating the internal mechanism of the power applying and the releasing and holding mechanism of one embodiment of my invention.
Figure 3:
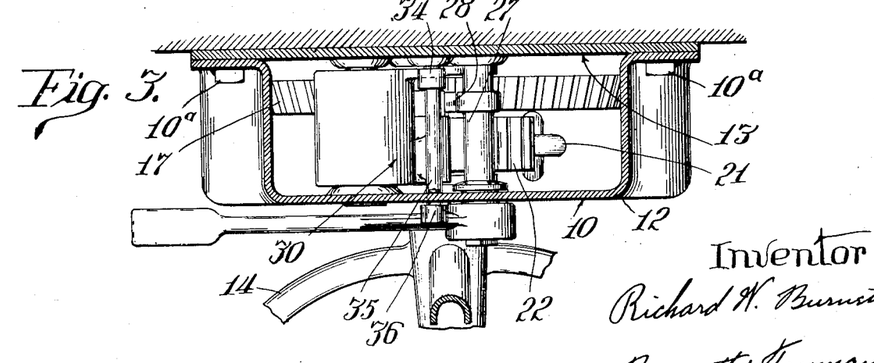
Fig. 3 is a fragmentary plan view of the mechanism shown in Fig. 2.

Referring first to Figs. 1 to 10 inclusive of the drawings 10 designates a housing in which the winding and the holding and releasing mechanisms are enclosed. The housing is preferably formed of pressed metal and consists of a front member 12 and a back member 13, the latter of which is adapted to be clamped to a vertical wall of a railway car. The clamping or attaching means may consist of a plurality of bolts 10c extending through flanges of the housing members and through the side wall of the car. The winding member consists preferably of a hand wheel 14 secured to one end of a shaft 15, journaled in suitable bearings of the housing. The shaft 15 is formed preferably integrally with a pinion 16 which meshes with a large gear 17 revoluble on a shaft 18. The large gear 17 is provided at one side with a grooved winding drum 19. The winding drum 19 is preferably formed integrally with the gear 17 and is provided with an arcuate winding surface 20 for a flexible member, preferably a chain 21. The chain is attached at one end to the drum so as to be wound thereon and communicates power to the brake rigging underneath the car (not shown) to move the brake shoes against the car wheels. Preferably the grooved winding surface 20 is of such length that any slack in the brake rigging and in the hand brake apparatus may be taken up and the brake shoes set with braking pressure against the wheels of the car by movement of the drum 19 less than one revolution. That is, the center line of the winding surface is preferably in one plane and for any setting operation the chain does not have to wind upon itself. The chain 21 is preferably attached to the winding drum at a point of greatest radius, so that the initial turning movement of the winding drum will take up the slack and wind the flexible member 21 upon surfaces of decreasing radius. The position of the winding drum shown in Fig. 2 represents the position of the drum and chain when the brakes are in their set position for the average types of brake rigging now in general use.

In order to set the brakes, the brakeman grasps the hand wheel and imparts a clockwise rotation thereto with reference to Fig. 1. This movement of the hand wheel, by reason of the intermeshing pinion and large gear, imparts a counterclockwise movement to the winding drum, as viewed in Fig. 2, to wind the connector 21 upon a progressively decreasing radius of the winding drum.

Figure 9:
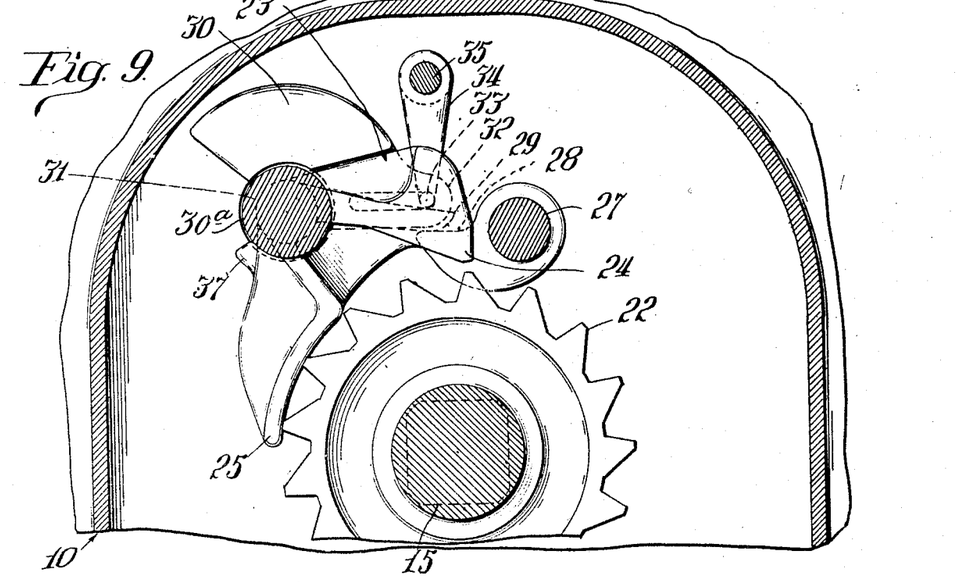
Fig. 9 is a fragmentary front view with parts broken away illustrating the position of the pawl and weight when the pawl is released from its holding position by means of the cam member shown in Fig. 8.

In order to prevent undesired reverse movement of the winding mechanism, I have provided improved holding and releasing means operatively positioned in the upper portion of the housing so as to cooperate with a ratchet gear 22 formed on the shaft 15. Preferably the ratchet gear 22 is formed integrally with the shaft 15 and the pinion gear 16. The reference character 23 designates generally a holding pawl journaled in the housing in a position to normally engage the teeth of the ratchet gear 22. One end of the pawl is formed with a weighted portion so as to insure normal engagement of this end of the member with the ratchet gear to prevent the movement of the winding mechanism in a reverse direction. The other end of the pawl is formed with a curved tail portion 25 adapted, under certain conditions, hereafter explained, to be moved into frictional engagement with the ratchet gear and thereby retard reverse movement of the winding mechanism. The means for releasing the end 24 of the pawl out of engagement with the ratchet teeth consists preferably of a trip lever 26 positioned at the outside of the housing between the housing and the hand wheel so that it can be readily manipulated by the brakeman. The trip lever 26 is on a cam shaft 27 provided with a cam 28, the end of which is adapted to bear against the under surface of the pawl to lift the pawl out of engagement with the ratchet teeth. Preferably the trip lever and cam are pivoted on an axis different from that of the holding pawl so that operation of the trip lever will exert compound leverage on the pawl, preferably by engagement with the weighted end portion at a point remote from the pivotal axis of the holding pawl. The engagement of the cam 28 is preferably with a projection 29 at one side of the pawl so that the cam can project past the side face of the ratchet gear. When it is desired to effect an instantaneous release of the brakes, that is to say—a full release in a single operation, the trip lever is raised so as to disengage the tooth portion 24 of the pawl from the teeth of the ratchet, whereupon the tension in the brake rigging beneath the car, together with the weight of the connector 21, will produce a reverse spinning movement of the hand wheel and winding drum. During this character of release the nose of the pawl is held in its raised or disengaged position a sufficient length of time to permit a complete release of the brakes. The said nose of the pawl may be held in its raised position by manually holding the lever 26 in its raised or pawl releasing position. If it should be inconvenient for the brakeman to hold the trip lever elevated during the complete release of the brakes, he can shift the weight 30, in a manner hereinafter described, to bear against the shoulder 37 of the pawl in a manner to hold the nose 24 of the pawl disengaged from the ratchet. If it is desired to release the brakes by a "notching off" or "step by step" release, the trip lever 26 may be raised to disengage the holding pawl from the ratchet gear and then immediately lowered so as to permit reengagement of the toothed end of the pawl with the ratchet teeth. The weighted end 24 of the pawl, assuming the weight 30 is in the normal position shown in Fig. 2, insures re-engagement of the pawl with the ratchet. If it is desired to retard the reverse movement of the winding mechanism during the instantaneous release, the trip lever 26 is raised to such position that the tail portion 25 of the holding pawl is brought into frictional engagement with the teeth of the ratchet wheel, as shown in Fig. 9 of the drawings.

Figure 10:
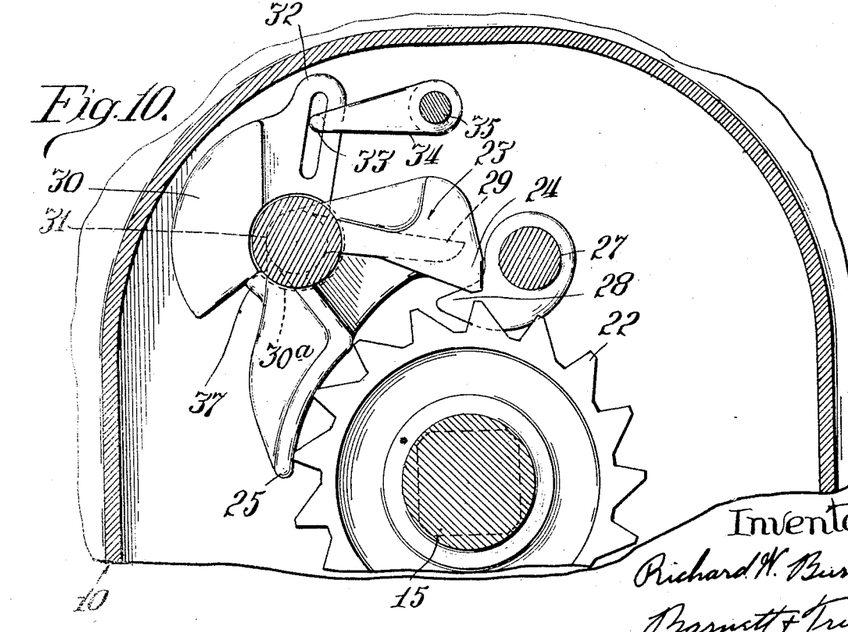
Fig. 10 illustrates the position of the same parts when the pawl is released by the action of the weight member shown in Fig. 6, or when the said pawl is held out of engagement with the ratchet after it has been released by upward movement of the releasing cam.

It is often desirable to release the braking pressure gradually through the manipulation of the hand wheel or other member employed for revolving the winding drum. In order to hold the holding pawl out of engagement with the teeth of the ratchet gear during the graduated release, I have provided a weight member 30 which is movable into and out of engagement with the tail end of the pawl 23 so as to lift the tooth end of the pawl out of holding position, when it is relieved of the braking pressure, for example, by a slight tightening movement of the hand brake. The weight member 30 is preferably pivoted to rotate about the axis of the holding pawl and comprises a body portion formed with a hub 30a adapted to fit over the shaft portion 31 of the pawl. The weighted body 30 normally projects over the upward portion of the pawl and normally maintains the position indicated in Figs. 2 and 9. That is to say, a position in which the weight of the member 30 does not affect the operation of the pawl. One end portion of the weighted member is formed with a slotted arm 32 adapted to receive a pin 33 of a weight operating arm 34. The arm 34 is secured to a shaft 35 journaled in the housing. An operating handle 36 is secured to the portion of the shaft 35 which extends out of the housing. The weight of the body 30 is so distributed that it will remain in the position shown in Figs. 2 and 9 until the operating lever 34 is moved to swing it about the pivotal axis of the pawl and into engagement with the shoulder 37 of the pawl. In the latter position the weight 30 bears against the shoulder 37 so as to rock the pawl out of engagement with the ratchet teeth when the ratchet engaging end of the pawl is relieved from the reverse pressure for example, when the hand wheel is rotated in a direction to increase the braking pressure. The said weight 30, when moved to the above position, also serves to hold the nose of the pawl in its elevated position after it has been manually disengaged from the ratchet by means of the lever 26. When the weight member 30 is in the position to bear against the shoulder 37 and the pawl is released as shown in Fig. 10, the tail portion 25 will bear against the ratchet teeth but without sufficient pressure to produce appreciable friction. However, if it is desired to increase the friction, the brakeman can raise the tripping lever so as to force the cam 28 against the lateral extending web 29 of the pawl and transmit great pressure through the pawl to the edge of the ratchet teeth, thereby serving as a brake to resist the reverse movement of the hand wheel and winding drum. When it is desired to again re-engage the weighted end of the pawl with the ratchet teeth, it is necessary only to turn the operating member 36 in the appropriate direction to move the weighted member 30 to the position shown in Figs. 2 and 9. Thereupon the weighted end 24 of the pawl will fall by gravity into engagement with the teeth of the ratchet gear.

The trip lever 26 may be supported in the normal inactive position shown in Fig. 1, by any suitable means. For example, by a suitable stop 40 formed on or attached to the housing.

Figure 11:
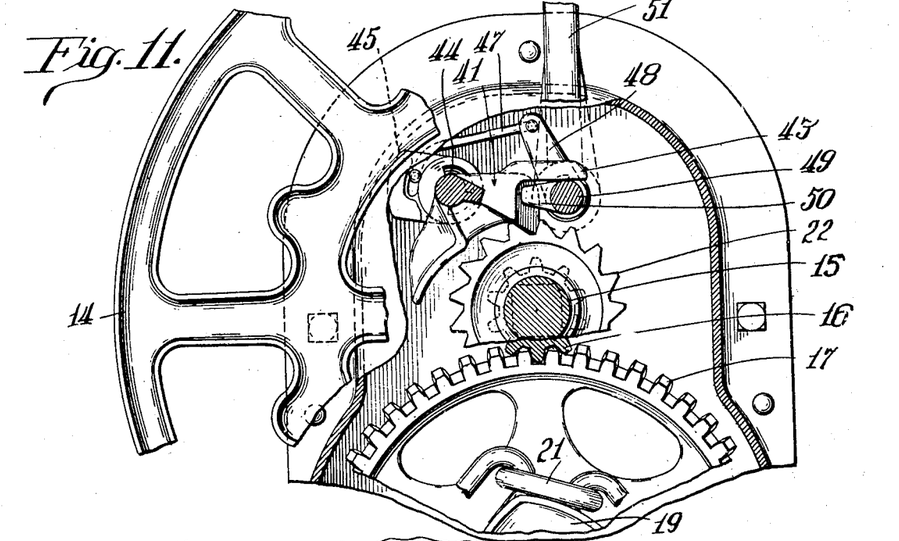
Fig. 11 is a fragmentary front view similar to Fig. 2, but illustrating a modified construction of the releasing and holding means.
Figure 12:
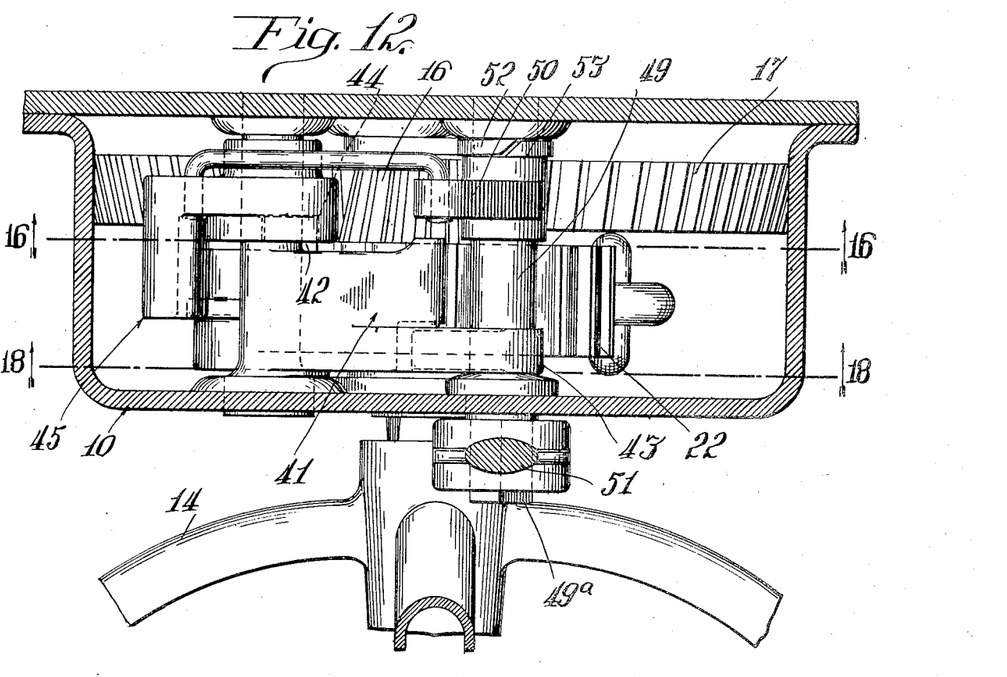
Fig. 12 is a plan section through the mechanism housing illustrating the relative position of the parts of the holding and releasing means.
Figure 13:
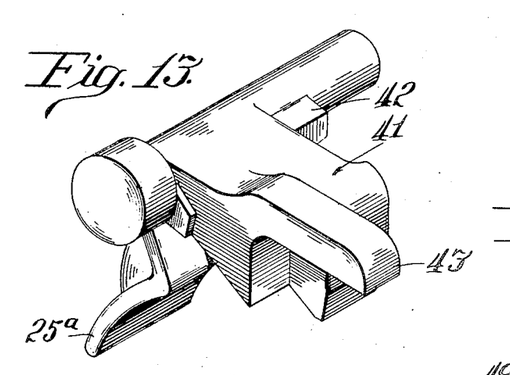
Fig. 13 is a detail view in perspective of a holding pawl employed in the embodiment shown in Fig. 11.
Figure 14:
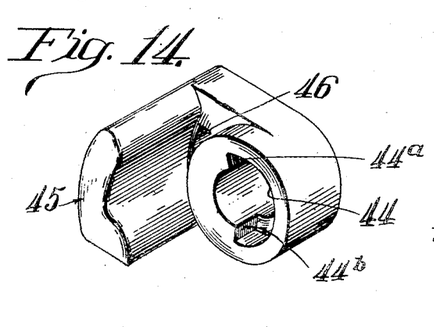
Fig. 14 is a view in perspective of the weight device employed in said embodiment.
Figure 15:
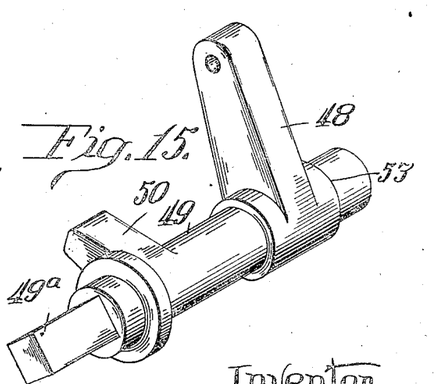
Fig. 15 is a perspective view of the releasing cam and shaft to which the releasing lever is adapted to be attached.
Figure 16:
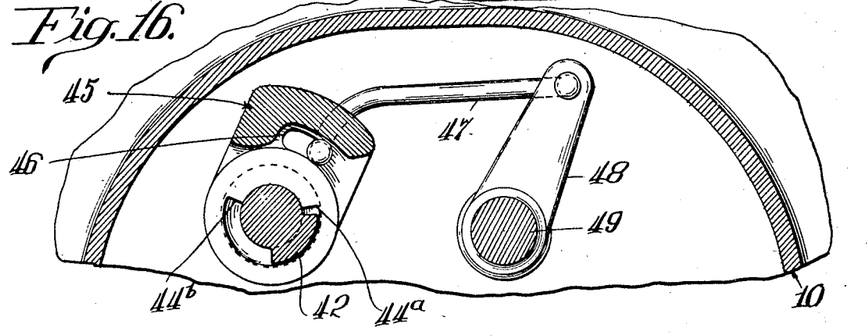
Fig. 16 is a fragmentary sectional view taken on line 16—16 of Fig. 12 illustrating the relative position of the releasing lever and the pawl controlling weight when the releasing lever is moved in one position.
Figure 17:
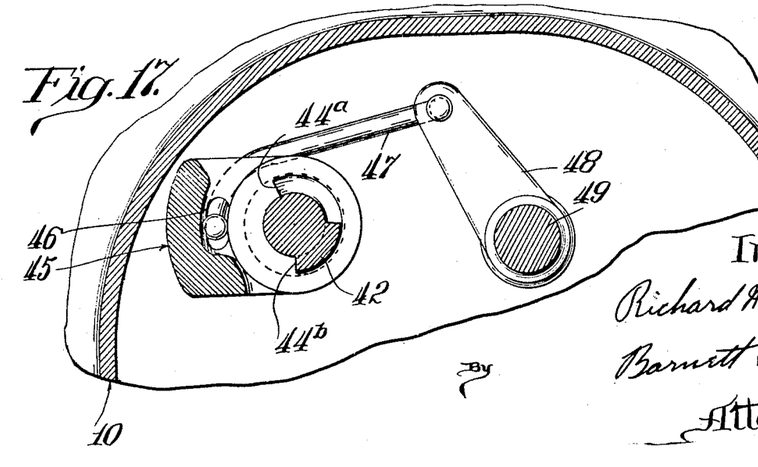
Fig. 17 is a view similar to Fig. 16 but illustrating the parts in the position which they assume when the releasing lever is moved to a position to permit graduated release of the hand brake.
Figure 18:
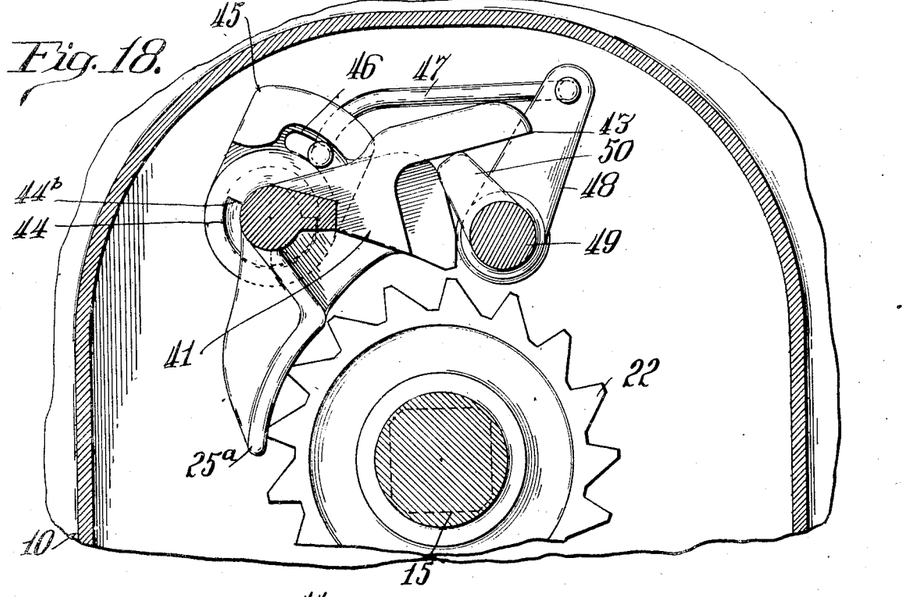
Figs. 18 and 19 are views taken on line 18—18 of Fig. 12 illustrating the position of the pawl together with the weight and releasing cam and correspond to the positions illustrated in Figs. 16 and 17.
Figure 19:
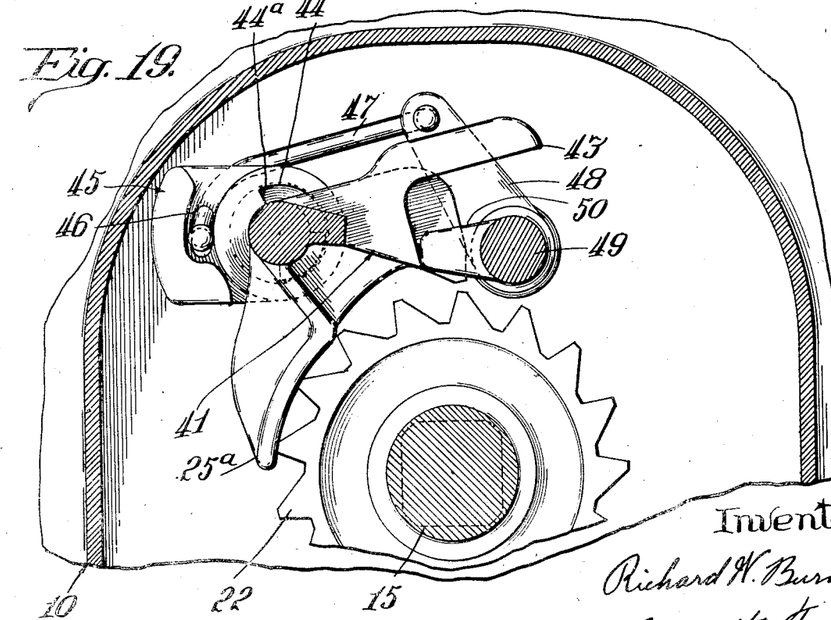

In Figs. 11 to 19 inclusive I have illustrated a modified construction in which a pawl actuating weight is moved into and out of its pawl raising position by shifting the trip lever from one position to another. In this embodiment of the invention, the pawl 41 is of the same general construction as the pawl illustrated in the preceding embodiment, but is provided on its shaft portion with a projecting lug 42 and at its toothed end with a forwardly projecting lug 43. The portion 42 of the pawl 41 is adapted to fit into a recess 44 formed in the hub portion of the weight member and to function as an abutment to limit the swinging movement of the weight member 45. The weighted member is provided with a slot 46 for receiving one end of the connecting link 47 adapted to be attached to an arm 48 extending upwardly from a shaft 49. The shaft 49 is also provided with a cam arm 50 which bears against the under portion of the projection 43 of the pawl. The particular configuration of the pawl and the construction and position of the cam arm 50 makes it practicable to position the cam arm 50 above the ratchet gear instead of above the pinion shown in the preceding embodiment. A trip arm 51 is fixed to the squared portion 52 of the shaft 49 so as to swing the arms 48 and 50 to any one of a plurality of positions. For the purpose of convenience I have illustrated three positions in the drawings. The normal position of the trip lever 51 is substantially vertical, as shown in Fig. 11 of the drawings, in which position the weighted member 45 is supported by means of its connection 47 with the arm 48 in a position whereby the weighted or toothed end of the pawl 41 is free to rise and fall over the ratchet teeth as the hand wheel is rotated in a direction to set the brake. This ratcheting of the pawl over the teeth does not impart a corresponding movement to the trip lever, the latter being held in its substantially vertical position by means of a spring member 52 interposed between the back member of the housing and a shoulder 53 of the shaft 49. When it is desired to effect an instantaneous release of the brake, the lever 51 is moved to the right of Fig. 11, so as to shift the position of the members to that position indicated in Fig. 18, whereupon the toothed end of the pawl 41 is lifted out of engagement with the ratchet teeth and the ratchet gear together with the winding drum is permitted to rotate in a reverse direction. This reverse rotation may be retarded by forcing the tail end 25a of the pawl 41 against the ratchet gear in the manner previously described. The slot 44 in the hub portion of the weighted member 45 is preferably of such length that when the trip lever is moved to the position to lift the pawl out of its holding position, the shoulder 44a of the slot will remain out of engagement with the stop portion 42 of the pawl (see Fig. 16). When it is desired to release the brakes by a graduated movement, the trip lever 51 is moved to the left of the position shown in Fig. 11, that is to say, to a position corresponding to the position shown in Fig. 19, whereupon the weight member 45 swings about its pivot until the shoulder 44b comes into engagement with the abutment 42 of the pawl shaft, shown in Fig. 17 and Fig. 19 of the drawings. When the weight is in this position, it supports the tooth end of the pawl out of engagement with the ratchet teeth. The slot 46 is of sufficient length whereby when the weight member 45 is in the position shown in Fig. 19, there is provision for lost motion movement between connector 47 and the ends of the slot 46, thereby permitting independent movements of the weight and the trip lever.

The lever 51 is supported in each of the three positions above noted by the resilience of the spring washer 52. In other respects the modified construction may be and preferably is identical in construction with the previous embodiment and therefore need not be specifically described herein.

While I have illustrated my invention in two specific embodiments, it will be obvious that further modifications in structure might be made without departure from the spirit of the invention. It will therefore be understood that I do not desire to limit my invention except in so far as the state of the art may require and in so far as the claims are expressly limited.

I claim:

1. The combination with power applying mechanism of a railway car hand brake, of means for holding the mechanism in brake-setting position including a pivoted holding pawl adapted, when in its holding position, to prevent reverse movement of the said power applying mechanism, means for releasing the power applying mechanism from its brake setting position comprising a lever manually operable to release the pawl from its holding position against the brake setting pressure of said power applying mechanism, and a counter-weight member movable, by operation of the lever in one direction, into engagement with the pawl to hold it, when released by said lever, in its released position.

2. The combination with power applying mechanism of a railway car hand brake, of means for holding the mechanism in brake-setting position including a pivoted holding pawl provided with a weighted end adapted to move it into holding position to prevent movement of the power applying means in one direction, means for moving the pawl to its releasing position comprising a counter-weight movable into engagement with one end of the pawl to lift it out of holding position when the pawl is relieved of the braking pressure and means for moving the counter-weight to its normal position of rest wherein it is ineffective to apply weight to the pawl.

3. The combination with power applying mechanism of a railway car hand brake, of means for holding the mechanism in brake setting position including a pivoted holding pawl provided with a weighted end adapted to move it into holding position to prevent movement of the power applying means in one direction, means for moving the pawl to its releasing position comprising a counter-weight positioned above the pawl and movable about the axis of the pawl into engagement with the other end of the pawl to lift said pawl out of holding position when it is relieved of the braking pressure and means for supporting said counter-weight in its normal position wherein it is ineffective to apply weight to the pawl.

4. The combination with power applying mechanism of a railway car hand brake, of a pivoted holding pawl automatically movable into position to prevent movement of the power applying means in one direction, means for releasing said mechanism from its brake setting position comprising a lever pivoted on a separate axis from the pawl and positioned to exert leverage on the pawl at a point remote from its pivotal axis to move it out of its holding position, and a weight member movable, by movement of said lever in one direction, into engagement with the pawl to hold it, when released by said lever, out of said holding position.

5. The combination with power applying mechanism of a railway car hand brake, of a pivoted holding pawl automatically movable into position to prevent movement of the power applying means in one direction, means for releasing said mechanism from its brake setting position comprising a lever pivoted on an axis separate from the pawl and positioned to exert pressure on the pawl at a point remote from its pivotal axis to move it out of its holding position, a weight member normally ineffective to apply weight on the pawl but which is movable independently of the movement of said lever into engagement with the pawl to hold it out of its said holding position, and means for moving said weight into engagement with the pawl and for supporting the said weight in said normally ineffective position.

6. The combination with power applying mechanism of a railway car hand brake, of a pivoted holding pawl automatically movable into position to prevent movement of the power applying means in one direction, means for releasing said power applying means from its brake setting position comprising a lever pivoted on an axis separate from the pawl and positioned to exert pressure on the pawl at a point remote from its pivotal axis to move it out of its holding position, a weight member movable relative to the lever and pivoted to swing about the pivotal axis of said pawl and into engagement with the pawl to hold it out of its said holding position, and means for moving said weight member into engagement with said pawl and for supporting the said weight in its normal inactive position.

7. The combination with power applying mechanism of a railway car hand brake, of a pivoted holding pawl automatically movable into position to prevent movement of the power applying means in one direction, means for releasing said power applying means from its brake setting position comprising a lever pivoted on an axis separate from the pawl and positioned to exert pressure on the pawl at a point remote from its pivotal axis to move it out of its holding position, a weight member pivoted to swing about the pivotal axis of said pawl and into engagement with the pawl to hold it out of its said holding position, and means having a lost motion connection with said weight member for moving it into and out of engagement with said pawl.

8. The combination with power applying mechanism of a railway car hand brake, of a pivoted holding pawl automatically movable into position to prevent movement of the power applying means in one direction, means for releasing said power applying means from its brake setting position comprising, a lever positioned to engage the pawl to move it out of its holding position, a weight member provided with a slot and pivoted to swing about the axis of said pawl into engagement with the pawl to hold it out of its said holding position, and a lever having a portion slidable in said slot and operable to move the weighted member into and out of engagement with said pawl.

9. The combination with power applying mechanism of a railway car hand brake and a housing for enclosing parts thereof, of mechanism for holding the power applying mechanism in and releasing it from its brake-setting position comprising a ratchet within the housing, a pawl pivoted within the housing to normally engage the teeth of the ratchet to prevent movement of the power applying means in one direction, a lever pivoted on a different axis from said pawl so as to exert compound leverage on the pawl to disengage it from the ratchet, and a pivoted weight member within the housing operable independently of the movement of said lever and movable into engagement with the pawl to hold it in said disengaged position after the said lever has returned to its normal inactive position.

10. The combination with power applying mechanism of a railway car hand brake and a housing for enclosing parts thereof, of mechanism for holding the power applying means in and releasing it from its brake-setting position comprising a ratchet within the housing, a pawl pivoted within the housing to normally engage at one end teeth of the ratchet to prevent movement of the power applying means in one direction and formed with a tail portion adapted to bear frictionally against the moving part of the power mechanism to retard movement thereof when the holding end of the pawl is in its released position, a lever pivoted on a different axis from said pawl so as to exert compound leverage on the pawl to disengage it from the ratchet and move the tail thereof into said retarding position, and a pivoted weight member within the housing and positioned independently of the tripping movement of said lever to engage the pawl to hold it in said disengaged position.

11. The combination with power applying mechanism of a railway car hand brake, of mechanism for holding the power applying means in and releasing it from its brake setting position comprising a ratchet, a pawl pivoted to normally engage at one end teeth of the ratchet to prevent movement of the power applying means in one direction and formed with a tail portion adapted to bear frictionally against a moving part of the power mechanism to retard movement thereof when the holding end of the pawl is in its released position, a lever pivoted on a different axis from said pawl so as to exert compound leverage on the pawl to disengage it from the ratchet and move the tail thereof into said retarding position, a pivoted weight member movable into engagement with the pawl to hold it in its released position, and means providing a lost motion connection between said weight member and lever for moving the weight member into and out of engagement with said pawl.

12. The combination with power applying mechanism of a railway car hand brake, of mechanism for holding the power applying means in and releasing it from its brake setting position comprising a ratchet, a pawl pivoted to normally engage the teeth of the ratchet to prevent movement of the power applying means in one direction, lever mechanism for exerting pressure against the under portion of said pawl to lift it out of engagement with said ratchet and a weight member having a lost motion connection with said lever mechanism and movable into engagement with the pawl to hold the pawl out of its holding position.

13. The combination with power applying mechanism of a railway car hand brake, of mechanism for holding the power applying mechanism in and releasing it from its brake setting position comprising a ratchet, a pawl pivoted to normally engage the teeth of the ratchet to prevent movement of the power applying means in one direction and provided with a tail piece adapted to retard the reverse movement of said mechanism when the pawl is moved to its disengaged position, lever mechanism for exerting pressure upwardly at an end portion of said pawl to lift it out of engagement with the ratchet when the lever is moved in one direction, and weight mechanism movable into engagement with the tail piece of said pawl, when the lever is moved in another direction, whereby the weight of said member will lift the pawl out of engagement with said ratchet when it is relieved of braking pressure.

14. The combination with power applying mechanism of a railway car hand brake, of mechanism for holding the power applying mechanism in and releasing it from its brake setting position comprising a ratchet, a pawl pivoted to normally engage the teeth of the ratchet to prevent movement of the power applying means in one direction and provided with a tail piece adapted to retard the reverse movement of said mechanism when the pawl is moved to its disengaged position, lever mechanism for exerting pressure upwardly at an end portion of said pawl to lift it out of engagement with the ratchet when the lever is moved in one direction, and weight mechanism movable into engagement with the tail piece of said pawl, when the lever is moved in another direction, whereby the weight of said member will lift the pawl out of engagement with said ratchet when it is relieved of braking pressure; the weight member being provided with a lost motion connection with said lever, means whereby the said weight and pawl may operate about their pivots simultaneously when the releasing lever is in the last named position.

15. The combination with the hand power mechanism of a railway car hand brake, of mechanism for holding said power mechanism in and releasing it from its brake setting position comprising toothed members, a lever movable in one direction to forcibly release one of said toothed members from another against the pressure exerted by said hand power mechanism and a weighted member pivoted on an axis separate from the lever for movement relative to said lever; said weighted member being positioned, by movement of said lever in the opposite direction, reverse to that to lift the pawl out of its holding position when the said braking pressure is relieved.

16. The combination with the hand power mechanism of a railway car hand brake, of mechanism for holding said power mechanism in and releasing it from its brake setting position comprising a ratchet and pawl, a cam positioned to engage the pawl at a point remote from its pivot, a lever operable in one direction to move the cam to force the pawl out of engagement with the ratchet against the braking pressure exerted by said hand power mechanism, and a weighted member operable about an axis separate from said lever and movable relative to said lever and by the operation thereof into engagement with the other end of the pawl to hold the ratchet engaging end of the pawl out of its holding position.

17. The combination with the hand power mechanism of a railway car hand brake, of mechanism comprising toothed members for holding said power mechanism in its brake setting position, a lever provided with a cam and operable in one direction to disengage one of said toothed members from its holding position, and a weight member movably engaged by the lever when the lever is moved in one direction and which, when the lever is moved in another direction, actuates by gravity to move one of said toothed members out of its holding position and support it in its released position when the braking pressure on said toothed member is relieved.

18. The combination with power applying mechanism of a railway car hand brake, of mechanism for holding the power applying means in and releasing it from its brake setting position comprising a ratchet, a pawl pivoted to normally engage the teeth of the ratchet to prevent reverse movement of the power applying means in one direction, a hand operated lever pivoted on an axis separate from the pawl and movable in one direction to release the power applying means against the force of the braking pressure, and a weight member pivoted on an axis separate from said lever and adapted in one position to lift and support the pawl out of its engagement with the ratchet when the braking pressure on the pawl is relieved and movable to another position by said hand lever to hold the pawl in engagement with the ratchet.

R. W. BURNETT.